(12) United States Patent
Kato et al.

(10) Patent No.: US 8,757,500 B2
(45) Date of Patent: Jun. 24, 2014

(54) WIRELESS IC DEVICE

(75) Inventors: Noboru Kato, Moriyama (JP); Yuya Dokai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 497 days.

(21) Appl. No.: 12/603,608

(22) Filed: Oct. 22, 2009

(65) Prior Publication Data

US 2010/0038437 A1 Feb. 18, 2010

Related U.S. Application Data

(63) Continuation of application No. PCT/JP2008/058614, filed on May 9, 2008.

(30) Foreign Application Priority Data

May 11, 2007 (JP) .................................. 2007-127428

(51) Int. Cl.
*G06K 19/06* (2006.01)

(52) U.S. Cl.
USPC .......................................................... 235/492

(58) Field of Classification Search
USPC ........................................ 235/492; 340/572.1
See application file for complete search history.

(56) References Cited

U.S. PATENT DOCUMENTS

| | | | |
|---|---|---|---|
| 3,364,564 A | 1/1968 | Kurtz et al. | |
| 4,794,397 A | 12/1988 | Ohe et al. | |
| 5,232,765 A | 8/1993 | Yano et al. | |
| 5,253,969 A | 10/1993 | Richert | |
| 5,337,063 A | 8/1994 | Takahira | |
| 5,374,937 A | 12/1994 | Tsunekawa et al. | |
| 5,399,060 A | 3/1995 | Richert | |
| 5,491,483 A | 2/1996 | D'Hont | |
| 5,528,222 A | 6/1996 | Moskowitz et al. | |
| 5,757,074 A | 5/1998 | Matloubian et al. | |
| 5,854,480 A | 12/1998 | Noto | |
| 5,903,239 A | 5/1999 | Takahashi et al. | |

(Continued)

FOREIGN PATENT DOCUMENTS

| CA | 2 279 176 A1 | 7/1998 |
|---|---|---|
| DE | 10 2006 057 369 A1 | 6/2008 |

(Continued)

OTHER PUBLICATIONS

Official Communication issued in International Patent Application No. PCT/JP2008/063025, mailed on Aug. 12, 2008.

(Continued)

*Primary Examiner* — Daniel Hess
(74) *Attorney, Agent, or Firm* — Keating & Bennett, LLP

(57) ABSTRACT

A wireless IC device has a structure such that the size of a radiation plate and a radiation characteristic may be determined irrespective of an impedance of a wireless IC chip. The wireless IC device includes a wireless IC chip that is arranged to process transmission and reception signals, a spiral matching inductance element and a plane electrode that are located on a surface of a feeder circuit substrate, and a coil-shaped radiation plate located on a radiation substrate. Plane electrodes connected to both ends of the radiation plate are electromagnetically coupled respectively to the inductance element and the plane electrode. The wireless IC chip is operated by a signal received by the radiation plate, and a response signal from the wireless IC chip is radiated outside from the radiation plate.

16 Claims, 7 Drawing Sheets

(56) References Cited

U.S. PATENT DOCUMENTS

| | | |
|---|---|---|
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1 | 9/2002 | Porte |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,158,033 B2 * | 1/2007 | Forster ............... 340/572.1 |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0032926 A1 | 2/2006 | Baba et al. |
| 2006/0044192 A1 | 3/2006 | Egbert |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0214801 A1 | 9/2006 | Murofushi et al. |
| 2006/0220871 A1 | 10/2006 | Baba et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0070003 A1 | 3/2008 | Nakatani et al. |
| 2008/0087990 A1 | 4/2008 | Kato et al. |
| 2008/0143630 A1 | 6/2008 | Kato et al. |
| 2008/0169905 A1 | 7/2008 | Slatter |
| 2008/0272885 A1 | 11/2008 | Atherton |
| 2009/0002130 A1 | 1/2009 | Kato |
| 2009/0009007 A1 | 1/2009 | Kato et al. |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0109102 A1 | 4/2009 | Dokai et al. |
| 2009/0160719 A1 | 6/2009 | Kato et al. |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0321527 A1 | 12/2009 | Kato et al. |
| 2010/0103058 A1 | 4/2010 | Kato et al. |
| 2011/0031320 A1 | 2/2011 | Kato et al. |
| 2011/0063184 A1 | 3/2011 | Furumura et al. |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 347 533 A1 | 9/2003 |
| EP | 1 357 511 A2 | 10/2003 |
| EP | 1 547 753 A1 | 6/2005 |
| EP | 1 548 872 A1 | 6/2005 |
| EP | 1 703 589 A1 | 9/2006 |
| EP | 1 744 398 A1 | 1/2007 |
| EP | 1 841 005 A1 | 10/2007 |
| EP | 1 865 574 A1 | 12/2007 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 251 934 A1 | 11/2010 |
| GB | 2 305 075 A | 3/1997 |
| GB | 2461443 A | 1/2010 |

(56) References Cited

FOREIGN PATENT DOCUMENTS

| | | |
|---|---|---|
| JP | 50-143451 A | 11/1975 |
| JP | 61-284102 A | 12/1986 |
| JP | 62-127140 U | 8/1987 |
| JP | 02-164105 A | 6/1990 |
| JP | 02-256208 A | 10/1990 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-88586 A | 4/1996 |
| JP | 08-088586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-093029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 9-512367 A | 12/1997 |
| JP | 10-069533 A | 3/1998 |
| JP | 10-69533 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-293828 A | 11/1998 |
| JP | 10-334203 A | 12/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-257292 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-111363 A | 4/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |

(56) References Cited

FOREIGN PATENT DOCUMENTS

| | | |
|---|---|---|
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-126750 A | 4/2004 |
| JP | 2004-127230 A | 4/2004 |
| JP | 2004-140513 A | 5/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-013976 A | 1/2006 |
| JP | 2006-13976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-18067 A | 1/2007 |
| JP | 2007-28002 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-150642 A | 6/2007 |
| JP | 2007-150868 A | 6/2007 |

(56) References Cited

FOREIGN PATENT DOCUMENTS

| | | |
|---|---|---|
| JP | 2007-159083 A | 6/2007 |
| JP | 2007-159129 A | 6/2007 |
| JP | 2007-166133 A | 6/2007 |
| JP | 2007-172369 A | 7/2007 |
| JP | 2007-172527 A | 7/2007 |
| JP | 2007-228325 A | 9/2007 |
| JP | 2007-266999 A | 10/2007 |
| JP | 2007-272264 A | 10/2007 |
| JP | 2007-287128 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-72243 A | 3/2008 |
| JP | 2008-083867 A | 4/2008 |
| JP | 2008-097426 A | 4/2008 |
| JP | 4069958 B2 | 4/2008 |
| JP | 2008-103691 A | 5/2008 |
| JP | 2008-107947 A | 5/2008 |
| JP | 2008-148345 A | 6/2008 |
| JP | 2008-519347 A | 6/2008 |
| JP | 2008-160874 A | 7/2008 |
| JP | 2008-197714 A | 8/2008 |
| JP | 2008-217406 A | 9/2008 |
| JP | 2008-288915 A | 11/2008 |
| JP | 2009-017284 A | 1/2009 |
| JP | 2009-25870 A | 2/2009 |
| JP | 2009-27291 A | 2/2009 |
| JP | 2009-044715 A | 2/2009 |
| JP | 3148168 U | 2/2009 |
| JP | 2009-182630 A | 8/2009 |
| JP | 2010-009196 A | 1/2010 |
| JP | 4609604 B2 | 1/2011 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/011144 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/081719 A1 | 7/2009 |
| WO | 2009/110381 A1 | 9/2009 |

OTHER PUBLICATIONS

Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/055758, mailed on Jun. 23, 2009.
Kato et al.: "Radio Frequency IC Device and Radio Communication System," U.S. Appl. No. 12/859,340, filed Aug. 19, 2010.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.

(56) References Cited

OTHER PUBLICATIONS

Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-to-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module", U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material with Electromagnetic Coupling Module,"; U.S. Appl. No. 12/536,663, filed Aug. 6, 2009.
Osamura et al.: "Packaging Material with Electromagnetic Coupling Module,"; U.S. Appl. No. 12/536,669, filed Aug. 6, 2009.
Dokai et al.: "Wireless IC Device and Component for Wireless IC Device,"; U.S. Appl. No. 12/543,553, filed Aug. 19, 2009.
Shioya et al.: "Wireless IC Device,"; U.S. Appl. No. 12/551,037, filed Aug. 31, 2009.
Ikemoto: "Wireless IC Device and Manufacturing Method Thereof,"; U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official communication issued in counterpart International Application No. PCT/JP2008/071502, mailed Feb. 24, 2009.
Kato et al.: "Wireless IC Device and Manufacturing Method Thereof,"; U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device,"; U.S. Appl. No. 12/469,896, filed May 21, 2009.
Ikemoto et al.: "Wireless IC Device,"; U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.

(56) References Cited

OTHER PUBLICATIONS

Ikemoto et al.: "Wireless IC Device and Electronic Apparatus,"; U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device,"; U.S. Appl. No. 12/510,338, filed Jul. 28, 2009.
Kato et al.: "Wireless IC Device,"; U.S. Appl. No. 12/510,340, filed Jul. 28, 2009.
Kato: "Wireless IC Device,"; U.S. Appl. No. 12/510,344, filed Jul. 28, 2009.
Kato et al.: "Wireless IC Device,"; U.S. Appl. No. 12/510,347, filed Jul. 28, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in corresponding European Patent Application No. 08752500.2, mailed on Jul. 21, 2010.

\* cited by examiner

WIRELESS IC DEVICE

BACKGROUND OF THE INVENTION

1. Field of the Invention

The present invention relates to a wireless IC device and, more particularly, to a wireless IC device that includes a wireless IC chip used for an RFID (Radio Frequency Identification) system.

2. Description of the Related Art

In recent years, an RFID system has been developed as an article management system, which includes a reader/writer that generates an induction field and an IC chip (also referred to as IC tag or wireless IC chip) that stores predetermined information allocated to an article or a casing, and non-contact communication is established between the reader/writer and the IC chip to transmit the information therebetween. A known existing wireless IC device equipped with an IC chip includes a non-contact IC medium module described in Japanese Unexamined Patent Application Publication No. 2003-331246.

The non-contact IC medium module is a combination of an LSI, a loop antenna and a capacitance element. The inductance of the line of the loop antenna and the capacitance of the capacitance element constitute a resonant circuit to carry out impedance matching between the loop antenna and the LSI.

However, in the non-contact IC medium module, in order to obtain an inductance value necessary for impedance matching with the LSI, it has been necessary to adjust the length of the loop antenna. Therefore, there has been a problem that the length of the loop antenna varies depending on the input impedance of an LSI used and, therefore, the size of the module itself and the antenna radiation characteristic vary.

SUMMARY OF THE INVENTION

In view of the above, preferred embodiments of the present invention provide a wireless IC device that is able to determine the size of a radiation plate and a radiation characteristic irrespective of an impedance of a wireless IC chip.

A wireless IC device according to a preferred embodiment of the present invention includes: a wireless IC chip arranged to process transmission and reception signals; a feeder circuit substrate that has a resonant circuit including a matching inductance element; and a radiation plate that is disposed at a radiation substrate, wherein the wireless IC chip is mounted on a surface of the feeder circuit substrate so as to be electrically connected to the resonant circuit to define an electromagnetic coupling module, the radiation substrate is stuck onto a rear surface of the feeder circuit substrate, and both ends of the radiation plate are electromagnetically coupled to the resonant circuit, and the wireless IC chip is operated by a signal received by the radiation plate, and a response signal from the wireless IC chip is radiated outside from the radiation plate.

In the wireless IC device, both ends of the radiation plate are electromagnetically coupled to the resonant circuit that incorporates the matching inductance element, so impedance matching between the wireless IC chip and the radiation plate is carried out by an inductance of the matching inductance element and a capacitance between wire electrodes of the matching inductance element. As a result, the size and shape of the radiation plate may be set so as to obtain a predetermined radiation characteristic irrespective of the impedance of the wireless IC chip.

According to various preferred embodiments of the present invention, impedance matching between the wireless IC chip and the radiation plate is carried out by an inductance of the matching inductance element and a capacitance between wire electrodes of the element, and the size and shape of the radiation plate may be set so as to obtain a predetermined radiation characteristic irrespective of the impedance of the wireless IC chip.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
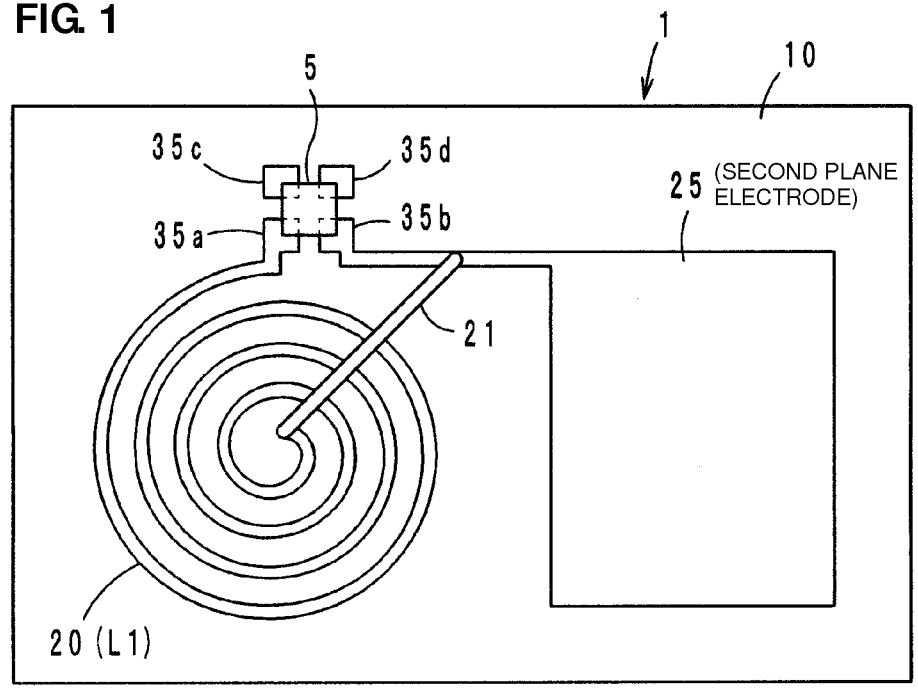
FIG. 1 is a plan view that shows an electromagnetic coupling module that constitutes a wireless IC device according to a first preferred embodiment of the present invention.

Hereinafter, preferred embodiments of a wireless IC device according to the present invention will be described with reference to the accompanying drawings. Note that in the drawings, like reference numerals denote like components or portions, and the overlap description is omitted.

First Preferred Embodiment, See FIG. 1 to FIG. 4

Figure 2:
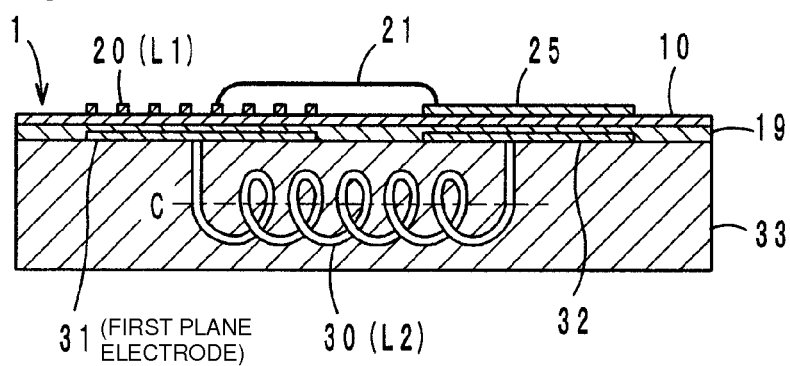
FIG. 2 is a partially cross-sectional view that shows the first preferred embodiment of the present invention.

FIG. 1 and FIG. 2 show a wireless IC device according to a first preferred embodiment of the present invention. The wireless IC device includes a wireless IC chip 5, an inductance element 20 (L1), a plane electrode 25 (referred to as second plane electrode), and a coil-shaped radiation plate 30. The wireless IC chip 5 processes transmission and reception signals of a predetermined frequency. The inductance element 20 and the plane electrode 25 are disposed on a surface of the feeder circuit substrate 10, which is preferably made of a flexible dielectric (for example, PET film). The radiation plate 30 is preferably embedded in the radiation substrate 33.

Figure 3:
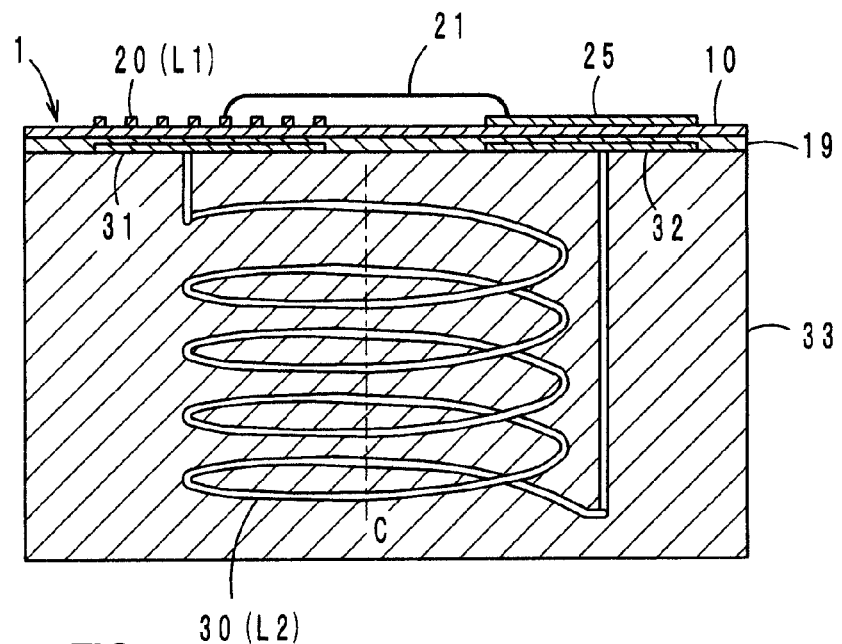
FIG. 3 is a partially cross-sectional view that shows an alternative preferred embodiment to the first preferred embodiment of the present invention.

The radiation substrate 33 includes a plurality of laminated dielectric (ceramic) sheets. As shown in FIG. 2, the coil-shaped radiation plate 30, of which the axis extends perpendicular or substantially perpendicular to a lamination direction in which the dielectric sheets are laminated, is provided in the radiation substrate 33. Plane electrodes 31 and 32 (the plane electrode 31 is referred to as first plane electrode) are disposed on the surface of the radiation substrate 33. FIG. 3 shows, an alternative preferred embodiment, so to speak, including a coil-shaped radiation plate 30 that has an axis C that extends parallel or substantially parallel to the lamination direction. In each of the coil-shaped radiation plates 30 respectively shown in FIG. 2 and FIG. 3, one end is electrically connected to the plane electrode 31 and the other end is electrically connected to the plane electrode 32 to define a second inductance element L2. A manufacturing method for embedding a coil-shaped inductance in a multilayer substrate (radiation substrate 33) is known in the existing art.

The inductance element 20 has a structure such that a wire electrode made of conductive paste or metal plating of Al, Cu, Ag, or the like, has a spiral shape. The center end portion of the spiral wire electrode is electrically connected to the plane electrode 25 via a wire 21. The outer end portion of the spiral wire electrode is electrically connected to a connecting electrode 35a. In addition, the inductance element 20 faces the plane electrode 31 to which one end of the radiation plate 30 is connected.

The plane electrode 25 is mounted on the surface of the feeder circuit substrate 10 preferably by sticking a metal thin plate or applying conductive paste or metal plating. The plane electrode 25 faces the plane electrode 32 that is connected to the other end of the radiation plate 30. In addition, the plane electrode 25 is electrically connected to the connecting electrode 35b.

The connecting electrodes 35a and 35b are electrically connected to input/output terminals (not shown) of the wireless IC chip 5. Electrically open connecting electrodes 35c and 35d are electrically connected to ground terminals (not shown) of the wireless IC chip 5. This connection is carried out using metal bumps, or the like. The wireless IC chip 5 preferably includes a clock circuit, a logic circuit, a memory circuit, and the like. The wireless IC chip 5 stores necessary information. The memory circuit allows information to be rewritten.

The feeder circuit substrate 10, on which the wireless IC chip 5 is thus mounted, is termed an electromagnetic coupling module 1. In addition, the feeder circuit substrate 10 and the radiation substrate 33 are stuck together preferably via an adhesive 19, for example. The adhesive 19 is preferably an electrically insulative material having a high dielectric property, for example.

The electromagnetic coupling module 1 is arranged so that the inductance element 20 faces the plane electrode 31, connected to one end of the radiation plate 30, to be magnetically coupled to each other, and the plane electrode 25 faces the plane electrode 32, connected to the other end of the radiation plate 30, to be capacitively coupled to each other.

Note that the couplings between both ends of the radiation plate 30 and the inductance element 20 and plane electrode 25 each may be any of magnetic coupling and capacitive coupling. In the present invention, the "electromagnetic coupling" indicates capacitive coupling and/or magnetic coupling, for example.

In the thus configured wireless IC device, both end portions (plane electrodes 31 and 32) of the radiation plate 30 are electromagnetically coupled to the resonant circuit that includes the inductance element 20. Thus, impedance matching between the wireless IC chip 5 and the radiation plate 30 is carried out by the inductance L1 of the inductance element 20 and a capacitance Cf between the wire electrodes of the element 20 and a capacitance C1 between the plane electrode 25 and the radiation plate 30 (plane electrode 32). Therefore, variations in capacitance are small, and variations in the frequency characteristic are also small. In addition, the size and shape of the radiation plate 30 may be set so as to obtain a predetermined radiation characteristic irrespective of the impedance of the wireless IC chip 5.

That is, the wireless IC device receives a high-frequency signal (for example, UHF frequency band) radiated from a reader/writer (not shown) by the radiation plate 30, and resonates an LC resonant circuit (in terms of an equivalent circuit, the LC resonant circuit including the inductance L1 of the inductance element 20, the inductance L2 of the radiation plate 30 and the capacitance C1 formed between the plane electrode 32, connected to the other end of the radiation plate 30, and the plane electrode 25), and then supplies only a reception signal of a predetermined frequency band to the wireless IC chip 5. On the other hand, the wireless IC device extracts predetermined energy from the reception signal, and matches information stored in the wireless IC chip 5 with a predetermined frequency in the LC resonant circuit using the predetermined energy as a driving source. After that, the wireless IC device transmits the information from the radiation plate 30 to the reader/writer.

In addition, the plane electrode 31 connected to one end of the radiation plate 30 is arranged to face the inductance element 20, so that a magnetic field generated at the inductance element 20 is radiated toward the plane electrode 31. Thus, eddy current occurs in the plane electrode 31, and the eddy current flows into the radiation plate 30 to generate the magnetic field at the radiation plate 30, thus carrying out transmission and reception with the reader/writer. In this way, the plane electrode 31 interrupts the magnetic field generated at the inductance element 20. When the radiation plate 30 is constructed to have a shape that enables a high-frequency signal of a predetermined frequency to be transmitted and received, the wireless IC device improves the degree of freedom of designing transmission and reception signals. In addition, when the plane electrode 31 is constructed to have an area larger than an area occupied by the inductance element 20, the magnetic field shielding effect of the inductance element 20 improves, and, in addition, the degree of freedom of design increases, and then the radiation characteristic improves.

In addition, large capacitive coupling occurs between the plane electrode 32, connected to the other end of the radiation plate 30, and the plane electrode 25. Thus, this large capacitance C1 increases the degree of freedom of design of impedance matching between the wireless IC chip 5 and the radiation plate 30. In addition, the wireless IC chip 5 and the radiation plate 30 are not electrically directly continuous with each other, so it is possible to prevent damage to the wireless IC chip 5 due to static electricity, which is an energy wave of 200 MHz or below, entering from the radiation plate 30.

In addition, a stray capacitance Cf occurs between the wire electrodes that constitute the inductance element 20, and the stray capacitance Cf also affects impedance matching or resonant frequency. However, by setting the capacitance C1 that occurs between the plane electrode 32 and the plane electrode 25 at a large value, it is possible to reduce the influence of variations in capacitance Cf due to variations in an interval of the wire electrodes. This further reduces variations in frequency used.

Furthermore, the resonant frequency of a signal from the radiation plate 30 is set to be higher than the resonant frequency of the inductance element 20 or the frequency used in the wireless IC device. In the first preferred embodiment, the resonant frequency of a signal from the radiation plate 30 means a resonant frequency caused by the inductance L2 of the radiation plate 30 and the capacitance C1 generated between the plane electrode 25 and the plane electrode 32. By setting the resonant frequency of a signal from the radiation plate 30 so as to be higher than the frequency used in the inductance element 20 or in the wireless IC device, the radiation plate 30 functions as an inductance at the frequency used in the wireless IC device. By so doing, the magnetic field is discharged from the radiation plate 30. When the radiation substrate 33 equipped with the radiation plate 30 that discharges the magnetic field as in the case of the first preferred embodiment is stuck onto or embedded in a dielectric, such as a PET bottle 60 (see FIG. 4) filled with water, or the like, it is possible to provide a wireless IC device that uses the dielectric as an electromagnetic radiation element.

Note that in the first preferred embodiment, the plane electrode 32, connected to the other end of the radiation plate 30, is capacitively coupled to the plane electrode 25; instead, both may be electrically directly continuous with each other. In this case, impedance matching is carried out by the inductance L1 of the inductance element 20 and the stray capacitance Cf between the wire electrodes.

Figure 5:
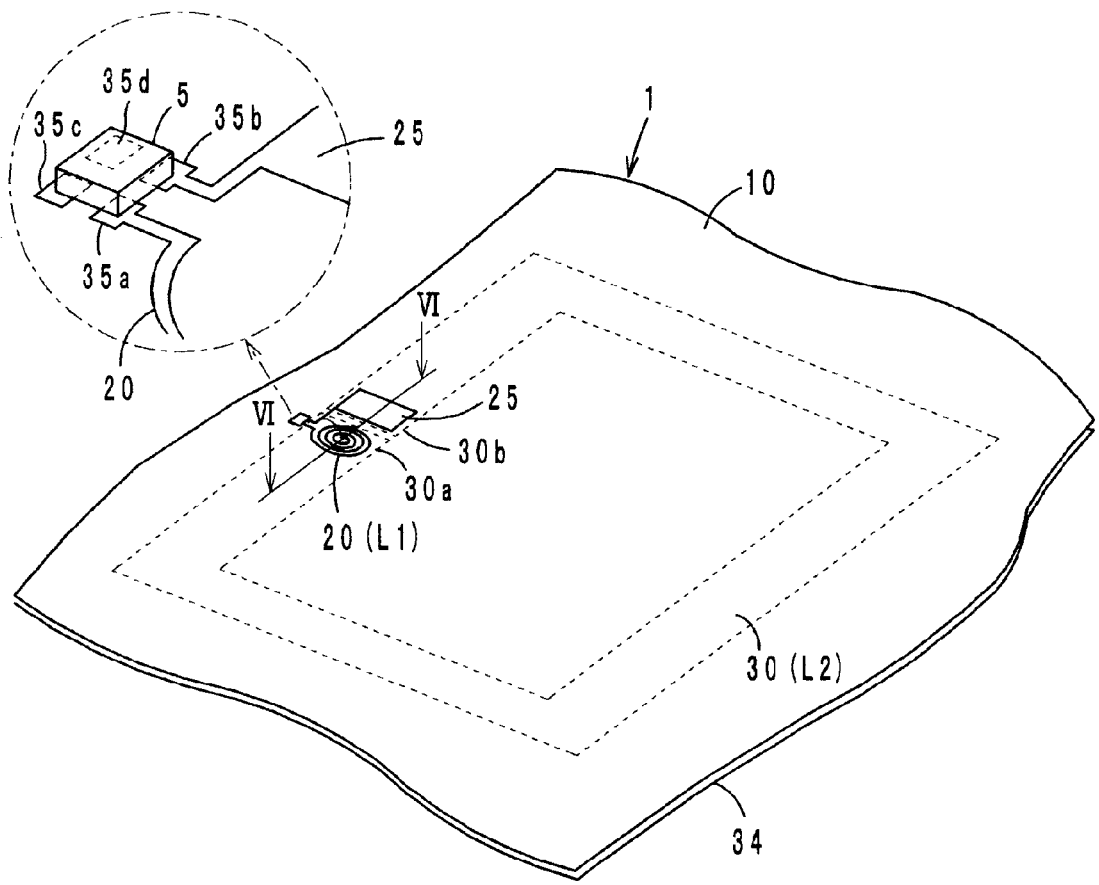
FIG. 5 is a perspective view that shows a wireless IC device according to a second preferred embodiment of the present invention.
Figure 6:
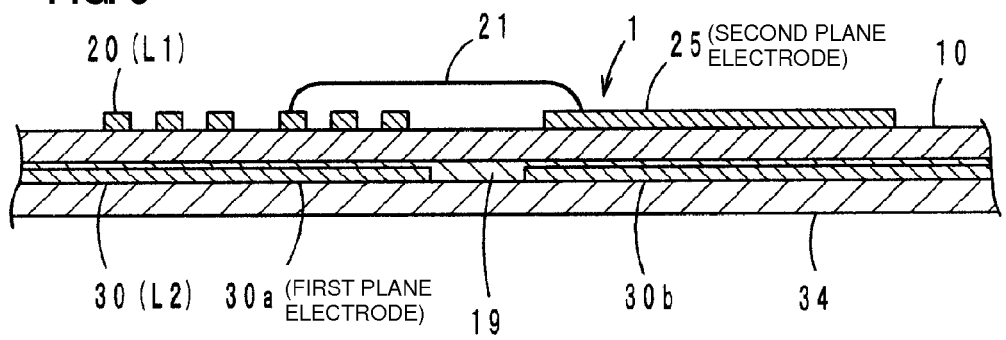
FIG. 6 is an enlarged cross-sectional view that is taken along the line VI-VI in FIG. 5.

Second Preferred Embodiment,
See FIG. 5 and FIG. 6

FIG. 5 and FIG. 6 show a wireless IC device according to a second preferred embodiment of the present invention. The wireless IC device includes a wireless IC chip 5, an inductance element 20 (L1), a plane electrode 25 (referred to as second plane electrode), and a radiation plate 30. The wireless IC chip 5 processes transmission and reception signals of a predetermined frequency. The inductance element 20 and the plane electrode 25 are provided on a surface of the feeder circuit substrate 10, which is preferably made of a flexible dielectric (for example, PET film). The radiation plate 30 is provided on a surface of a radiation substrate 34, which is preferably made of a flexible dielectric (for example, PET film).

The radiation plate 30 preferably has a belt-shaped configuration, and has a loop shape in which both end portions 30a and 30b face each other to constitute a second inductance element L2. The radiation plate 30 is formed preferably by sticking a metal thin plate made of a conductive material, such as aluminum foil and copper foil, on a surface of the radiation substrate 34 or is provided preferably by applying conductive paste or metal plating, such as Al, Cu and Ag, on the surface of the radiation substrate 34.

The inductance element 20 and the plane electrode 25 have configurations and shapes similar to those of the first preferred embodiment, and are respectively electrically connected to the input/output terminals of the wireless IC chip 5 and ground terminals. Then, the rear surface of the feeder circuit substrate 10 is stuck onto the surface of the radiation substrate 34 preferably via an adhesive 19, for example. The inductance element 20 faces one end portion 30a (referred to as first plane electrode) of the radiation plate 30. The plane electrode 25 faces the other end portion 30b of the radiation plate 30.

In the second preferred embodiment, the radiation plate 30 is held and stuck between the feeder circuit substrate 10 and the radiation substrate 34. This prevents degradation due to moisture, or the like.

In the electromagnetic coupling module 1 including the feeder circuit substrate 10 on which the wireless IC chip 5 is mounted, the inductance element 20 faces the one end portion 30a of the radiation plate 30 to be magnetically coupled to each other, and the plane electrode 25 faces the other end portion 30b of the radiation plate 30 to be capacitively coupled to each other. Note that the couplings at both end portions 30a and 30b of the radiation plate 30 each may be any of magnetic coupling and capacitive coupling.

In the thus configured wireless IC device, both end portions 30a and 30b of the radiation plate 30 are electromagnetically coupled to the resonant circuit that includes the inductance element 20. Thus, impedance matching between the wireless IC chip 5 and the radiation plate 30 is carried out by the inductance L1 of the inductance element 20 and the capacitance Cf between the wire electrodes of the element 20 and the capacitance C1 between the plane electrode 25 and the radiation plate 30 (the other end portion 30b). Therefore, variations in capacitance are small, and variations in the frequency characteristic are also small. In addition, the size and shape of the radiation plate 30 may be set so as to obtain a predetermined radiation characteristic irrespective of the impedance of the wireless IC chip 5.

The operation of the wireless IC device used as an RFID system is similar to that of the first preferred embodiment. That is, the wireless IC device receives a high-frequency signal (for example, UHF frequency band) radiated from a reader/writer (not shown) by the radiation plate 30, and resonates an LC resonant circuit (in terms of an equivalent circuit, the LC resonant circuit formed of the inductance L1 of the inductance element 20, the inductance L2 of the radiation plate 30 and the capacitance C1 formed between the other end portion 30b of the radiation plate 30 and the plane electrode 25), and then supplies only a reception signal of a predetermined frequency band to the wireless IC chip 5. On the other hand, the wireless IC device extracts predetermined energy from the reception signal, and matches information stored in the wireless IC chip 5 with a predetermined frequency in the LC resonant circuit using the predetermined energy as a driving source. After that, the wireless IC device transmits the information from the radiation plate 30 to the reader/writer.

In addition, the one end portion 30a of the radiation plate 30 exhibits an operation similar to that of the plane electrode 31 described in the first preferred embodiment. When the one end portion 30a is constructed to have an area larger than an area occupied by the inductance element 20, the magnetic field shielding effect of the inductance element 20 improves, and, in addition, the degree of freedom of design increases, and then the radiation characteristic improves.

In addition, the other end portion 30b of the radiation plate 30 exhibits an operation similar to that of the plane electrode 32 described in the first preferred embodiment. The large capacitance C1 generated between the other end portion 30b of the radiation plate 30 and the plane electrode 25 increases the degree of freedom of design of impedance matching between the wireless IC chip 5 and the radiation plate 30.

In addition, by setting the capacitance C1 generated between the other end portion 30b of the radiation plate 30 and the plane electrode 25 at a large value, it is possible to reduce the influence of variations in capacitance Cf due to variations in intervals of the wire electrodes of the inductance element 20. This further reduces variations in the frequency used.

Furthermore, as in the case of the first preferred embodiment, the resonant frequency of a signal from the radiation plate 30 is preferably set to be higher than the resonant frequency of the inductance element 20 or the frequency used in the wireless IC device. When the radiation substrate 34 equipped with the radiation plate 30 that discharges magnetic field is stuck onto a dielectric, such as a PET bottle filled with water, or the like, it is possible to provide a wireless IC device that uses the dielectric as an electromagnetic radiation element.

In addition, the feeder circuit substrate 10 and the radiation substrate 34 are preferably made of a flexible film substrate, so they may be stuck onto not only a flat portion of an article but also a curved or uneven portion of the article. This expands the possible applications of the wireless IC device.

Note that in the second preferred embodiment, the other end portion 30b of the radiation plate 30 is capacitively coupled to the plane electrode 25; instead, both may be electrically directly continuous with each other. In this case, impedance matching is carried out by the inductance L1 of the inductance element 20 and the stray capacitance Cf between the wire electrodes.

Figure 7:
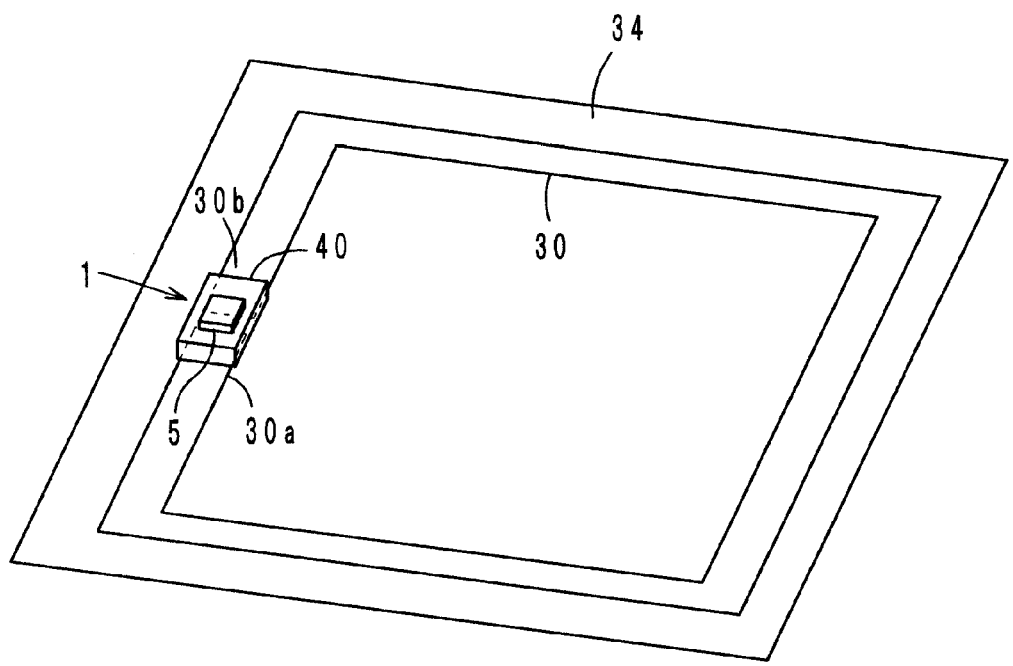
FIG. 7 is a perspective view that shows a wireless IC device according to a third preferred embodiment of the present invention.
Figure 8:
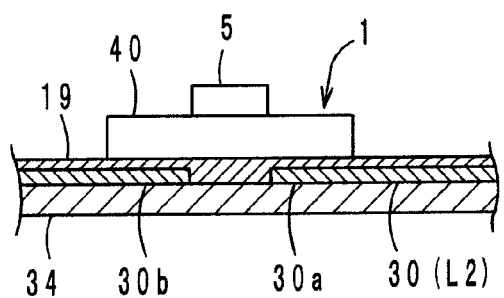
FIG. 8 is an enlarged cross-sectional view of a relevant portion of the third preferred embodiment of the present invention.
Figure 9:
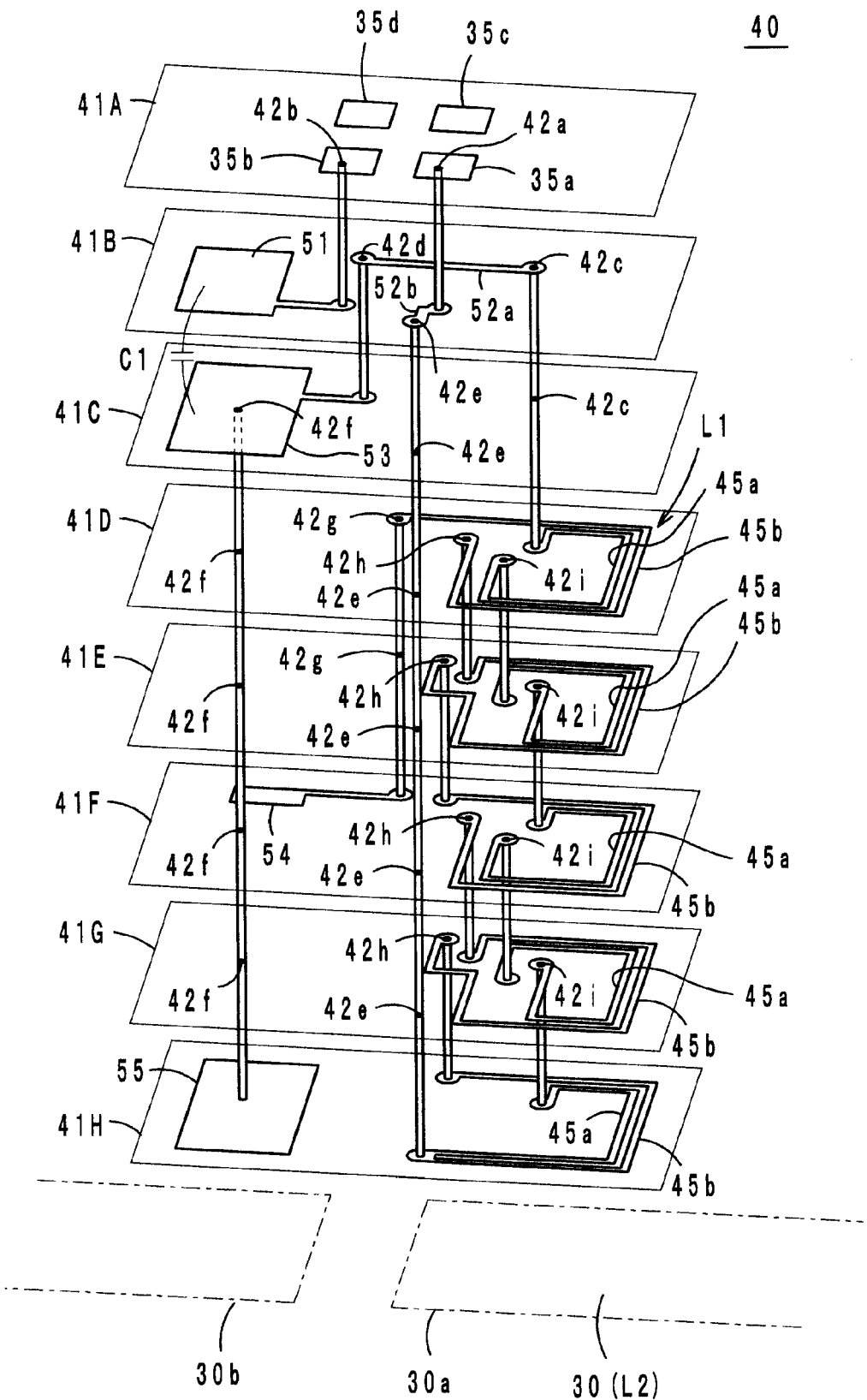
FIG. 9 is an exploded perspective view that shows a feeder circuit substrate according to the third preferred embodiment of the present invention.

Third Preferred Embodiment, See FIG. 7 to FIG. 9

FIG. 7 and FIG. 8 show a wireless IC device according to a third preferred embodiment of the present invention. The wireless IC device includes an electromagnetic coupling module 1 and a radiation plate 30. The electromagnetic coupling module 1 includes a feeder circuit substrate 40 on which a wireless IC chip 5 that processes transmission and reception signals of a predetermined frequency is mounted. The radiation plate 30 is provided on a surface of the radiation substrate 34, which is preferably made of a flexible dielectric (for example, PET film). The rear surface of the feeder circuit substrate 40 is stuck onto the surface of the radiation substrate 34 via an adhesive 19.

As in the case of the second preferred embodiment, the radiation plate 30 has a loop shape in which both end portions 30a and 30b face each other to constitute a second inductance element L2.

Note that, when the adhesive 19 is applied to cover the entire surface of the radiation plate 30, the adhesive 19 functions as a protection film that prevents degradation of the radiation plate 30.

As shown in FIG. 9, the feeder circuit substrate 40 preferably is a multilayer substrate, and embeds an inductance element L1 and a capacitance element C1 therein. More specifically, electrodes, or the like, which will be described below, are formed on ceramic sheets 41A to 41H made of a dielectric using conductive paste, or the like, by means of a known method, and these sheets 41A to 41H are laminated, compression-bonded and fired.

That is, connecting electrodes 35a to 35d and via hole conductors 42a and 42b are formed in the sheet 41A. A plane electrode 51 (second plane electrode), conductor patterns 52a and 52b and via hole conductors 42c, 42d and 42e are formed in the sheet 41B. A plane electrode 53 (third plane electrode) and via hole conductors 42c, 42e and 42f are formed in the sheet 41C. Conductor patterns 45a and 45b and via hole conductors 42a, 42f, 42h and 42i are formed in each of the sheets 41D and 41E. A plane electrode 54, conductor patterns 45a and 45b and via hole conductors 42e, 42f, 42h and 42i are formed in the sheet 41F.

Furthermore, conductor patterns 45a and 45b and via hole conductors 42e, 42f, 42h and 42i are formed in the sheet 41G. A plane electrode 55 and conductor patterns 45a and 45b are formed in the sheet 41H.

By laminating the sheets 41A to 41H, the inductance element L1 is formed by the conductor patterns 45a and 45b connected spirally at the via holes 42h and 42i. One end of the conductor pattern 45a is connected to the plane electrode 53 via the via hole conductor 42c, the conductor pattern 52a and the via hole conductor 42d. One end of the conductor pattern 45b is connected to the plane electrode 54 via the via hole conductor 42g. In addition, the other ends of the conductor patterns 45a and 45b are collected in the sheet 41H and then connected to the connecting electrode 35a via the via hole conductor 42e, the conductor pattern 52b and the via hole conductor 42a. In addition, the plane electrode 51 is connected to the connecting electrode 35b via the via hole conductor 42b. The plane electrode 51 faces the plane electrode 53 to form the capacitance C1. The plane electrode 53 is connected to the plane electrode 55 via the via hole conductor 42f.

Then, the connecting electrodes 35a and 35b are electrically connected to the input/output terminals of the wireless IC chip 5 via metal bumps. The connecting electrodes 35c and 35d are ground terminals and are connected to the ground terminals of the wireless IC chip 5.

Note that in the third preferred embodiment, the inductance element L1 preferably has a structure such that the two conductor patterns 45a and 45b are spirally arranged in parallel or substantially in parallel with each other. The two conductor patterns 45a and 45b respectively have different line lengths and may have different resonant frequencies. This can widen the band of the wireless IC device.

In the thus configured wireless IC device, the one end portion 30a of the radiation plate 30 (inductance element L2) is electromagnetically coupled to the inductance element L1, and the other end portion 30b is electromagnetically coupled to the plane electrode 55. Impedance matching between the wireless IC chip 5 and the radiation plate 30 is carried out by the inductance element L1, the capacitance Cf between the wire electrodes of the inductance element L1 and the capacitance C1 between the electrode 51 and the electrode 53. Therefore, variations in capacitance are small, and variations in the frequency characteristic are also small. In addition, the size and shape of the radiation plate 30 may be set so as to obtain a predetermined radiation characteristic irrespective of the impedance of the wireless IC chip 5.

That is, the wireless IC device receives a high-frequency signal (for example, UHF frequency band) radiated from a reader/writer (not shown) by the radiation plate 30, and resonates an LC resonant circuit (in terms of an equivalent circuit, the LC resonant circuit including the inductances L1 and L2 and the capacitance C1 formed between the plane electrodes 51 and 53), and then supplies only a reception signal of a predetermined frequency band to the wireless IC chip 5. On the other hand, the wireless IC device extracts predetermined energy from the reception signal, and matches information stored in the wireless IC chip 5 with a predetermined frequency in the LC resonant circuit using the predetermined energy as a driving source. After that, the wireless IC device transmits the information from the radiation plate 30 to the reader/writer.

Figure 4:
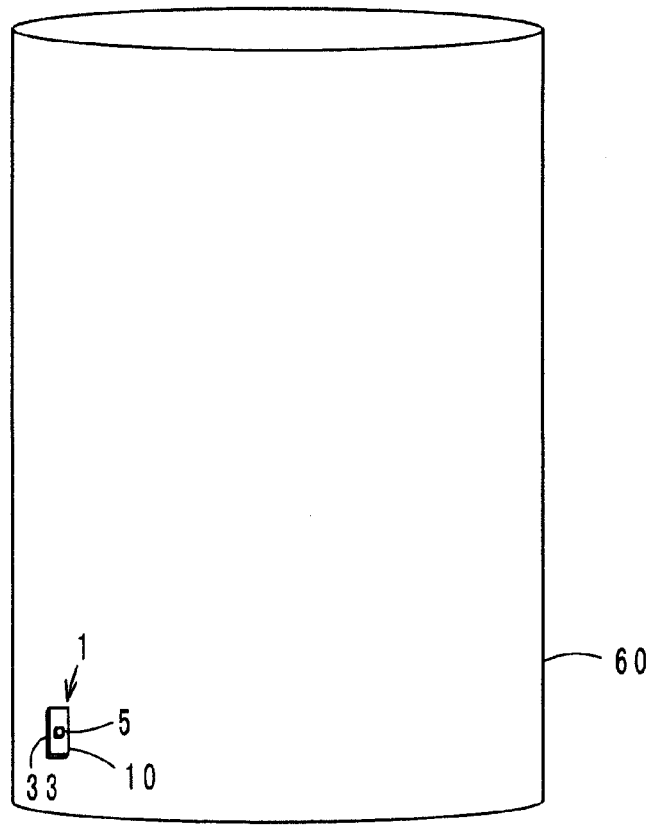
FIG. 4 is a perspective view that shows a state where the wireless IC device is stuck on a PET bottle.

Incidentally, the resonant frequency of a signal from the radiation plate 30 is preferably set so as to be higher than the resonant frequency of the inductance element L1 and the frequency used in the wireless IC device. In the third preferred embodiment, the resonant frequency of a signal from the radiation plate 30 means a resonant frequency caused by the inductance element L2 and the capacitance C1 generated between the plane electrodes 51 and 53. When the radiation plate 30 is used at a resonant frequency or below, the magnetic field occurs around the radiation plate 30, thus making it possible to transmit electromagnetic waves through a dielectric, such as a PET bottle or water. As electromagnetic waves are radiated toward the dielectric, reflection occurs at a boundary portion of different dielectric constants (between the electromagnetic coupling module 1 and the dielectric) and propagates toward the outside. Thus, as shown in FIG. 4, when the wireless IC device is stuck onto the surface of the PET bottle 60 filled with water, the wireless IC device may be used as an RFID system.

In addition, the arrangement that the one end portion 30a of the radiation plate 30 faces the inductance element L1 is similar to that of the second preferred embodiment. When the one end portion 30a is constructed to have an area larger than an area occupied by the inductance element L1, the magnetic field shielding effect of the inductance element L1 improves, and, in addition, the degree of freedom of design increases, and then the radiation characteristic improves.

In addition, large capacitive coupling occurs between the plane electrode 53 and the plane electrode 51, so this large capacitance C1 allows impedance matching between the wireless IC chip 5 and the radiation plate 30. In addition, the wireless IC chip 5 and the radiation plate 30 are not electrically directly continuous with each other, so it is possible to prevent damage to the wireless IC chip 5 due to static electricity, which is an energy wave of 200 MHz or below, entering from the radiation plate 30. Furthermore, the third plane electrode 53 is arranged so as to face the second plane electrode 51, so both are capacitively coupled to each other.

In addition, a stray capacitance Cf occurs between the wire electrodes that constitute the inductance element L1, and the stray capacitance Cf also affects impedance matching or the resonant frequency. However, by setting the capacitance C1 generated between the plane electrodes 51 and 53 at a large value, it is possible to reduce the influence of variations in capacitance Cf due to variations in interval of the wire electrodes. This further reduces variations in frequency used.

In addition, the feeder circuit substrate 40 preferably is a multilayer substrate, so the inductance element L1 and/or the capacitance C1 are of a laminated type, thus making it possible to form the compact feeder circuit substrate 40.

Note that in the third preferred embodiment, the plane electrode 53 is capacitively coupled to the plane electrode 51; instead, both may be electrically directly continuous with each other. In this case, impedance matching is carried out by the inductance L1 and the stray capacitance Cf between the wire electrodes. In addition, the feeder circuit substrate 40 may be formed so that resin sheets are laminated and compression-bonded.

Equivalent Circuits and their Characteristics, See FIG. 10 to FIG. 15

Figure 10:
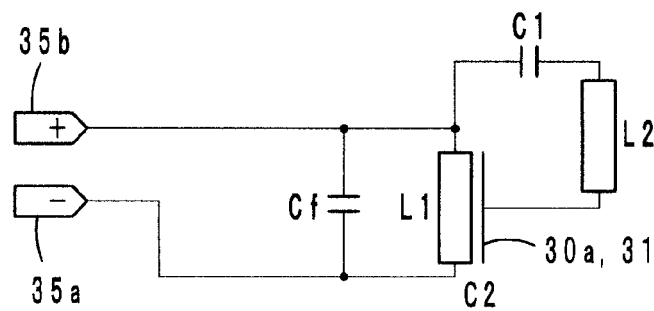
FIG. 10 is a circuit diagram that shows a first example of an equivalent circuit of the wireless IC device according to yet another preferred embodiment of the present invention.
Figure 11:
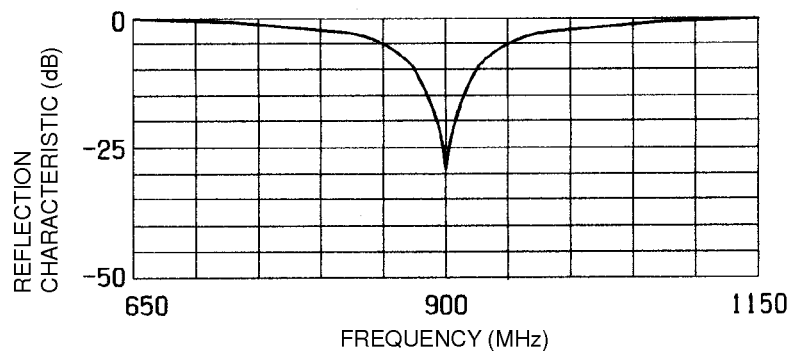
FIG. 11 is a graph that shows the reflection characteristic of the first example of the equivalent circuit.
Figure 12:
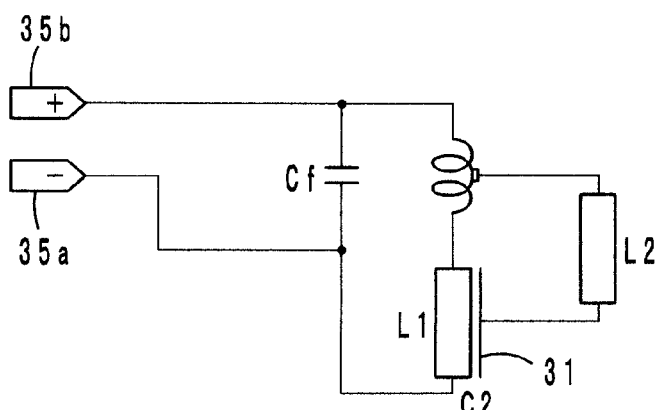
FIG. 12 is a circuit diagram that shows a second example of the equivalent circuit of the wireless IC device according to a preferred embodiment of the present invention.
Figure 13:
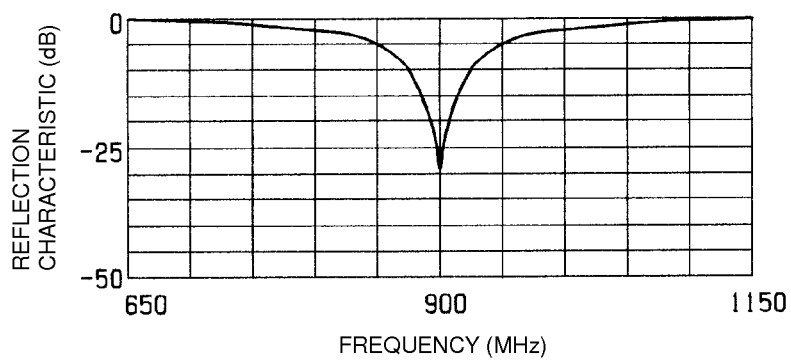
FIG. 13 is a graph that shows the reflection characteristic of the second example of the equivalent circuit.
Figure 14:
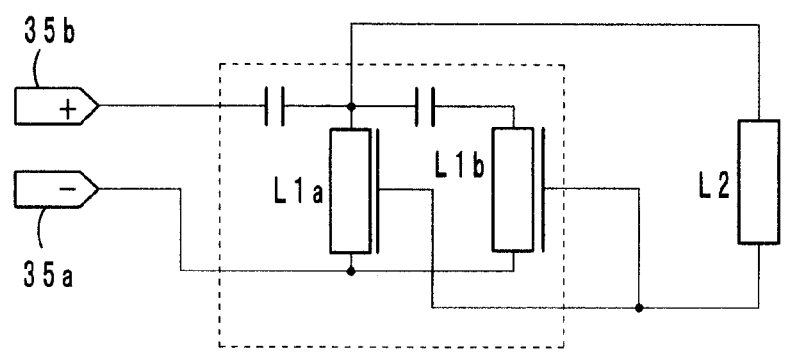
FIG. 14 is a circuit diagram that shows a third example of the equivalent circuit of the wireless IC device according to a preferred embodiment of the present invention.
Figure 15:
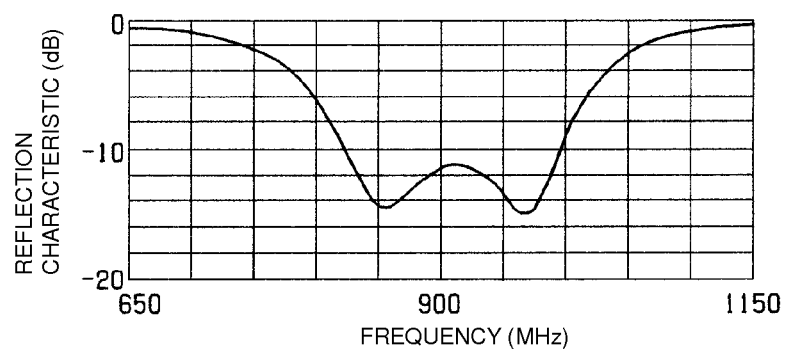
FIG. 15 is a graph that shows the reflection characteristic of the third example of the equivalent circuit.

Next, the equivalent circuits of the wireless IC devices according to various preferred embodiments of the present invention are shown in FIG. 10, FIG. 12 and FIG. 14, and the respective reflection characteristics are shown in FIG. 11, FIG. 13 and FIG. 15.

FIG. 10 shows a first example of the equivalent circuit. As described in the above preferred embodiments, this equivalent circuit is the one in which the first plane electrode 30a or 31 is arranged to face the inductance element L1 to form the capacitance C2, and the second plane electrode 25 is arranged between the wireless IC chip 5 and the radiation plate 30 (inductance element L2) to form the capacitance C1. The reflection characteristic is shown in FIG. 11. Note that the inductance element L1 and the plane electrode 30a or 31 in FIG. 10 schematically show a state where both are electromagnetically coupled to each other.

The equivalent circuit may be configured as a second example shown in FIG. 12. This equivalent circuit is the one in which the first plane electrode 31 is arranged to face the inductance element L1 to form the capacitance C2, and the other end portion of the inductance element L2 (radiation plate 30) is connected to the inductance element L1. The reflection characteristic is similar to that of the first example as shown in FIG. 13.

FIG. 14 shows a third example of the equivalent circuit. This equivalent circuit is the one in which, as described in the third preferred embodiment, the inductance element L1 is formed of two inductances L1a and L1b having different two resonant frequencies. Owing to the inductances L1a and L1b, the peak values occur at the respective resonant frequencies, and, as shown in FIG. 15, the reflection characteristic is such that the frequency used is widened.

Summary of Preferred Embodiments

The wireless IC device desirably includes a first plane electrode that is arranged to face a matching inductance element that that is electrically continuous with a radiation plate. The first plane electrode may be formed as one end of the radiation plate or may be arranged between the matching inductance element and one end of the radiation plate and that is electrically continuous with the radiation plate via a connecting portion. In addition, the area of the first plane electrode may be larger than an area occupied by the matching inductance element. In addition, the radiation plate may have a loop shape or may have a spiral shape.

By providing the first plane electrode, a magnetic field that occurs at the matching inductance element is radiated toward the first plane electrode. Thus, eddy current occurs in the first plane electrode, and the eddy current flows into the radiation plate to generate magnetic field at the radiation plate, thus carrying out transmission and reception with a reader/writer. The first plane electrode is able to interrupt the magnetic field generated at the matching inductance element. When the radiation plate has a shape such that a high-frequency signal of a predetermined frequency can be transmitted and received, the wireless IC device improves the degree of freedom of designing a transmission and reception frequency. In addition, when the first plane electrode is constructed to have an area larger than an area occupied by the matching inductance element, the magnetic field shielding effect of the matching inductance element improves, and, in addition, the degree of freedom of design increases, and then the radiation characteristic improves.

In addition, the wireless IC device may include a second plane electrode arranged between a wireless IC chip and the radiation plate. With the second plane electrode, it prevents direct electric current from flowing between the matching inductance element and the radiation plate, and, therefore, it is possible to prevent damage to the wireless IC chip due to static electricity, or the like. Furthermore, a third plane electrode may be provided between the second plane electrode and the radiation plate. Thus, the second plane electrode is capacitively coupled to the other end of the radiation plate.

In addition, the wireless IC device may include a second plane electrode that is arranged between the wireless IC chip and the radiation plate, and may be arranged so that one end of the radiation plate faces the matching inductance element and the other end of the radiation plate faces the second plane electrode. As described above, the magnetic field of the matching inductance element is interrupted, and direct electric current is prevented from flowing between the matching inductance element and the radiation plate. At least one of the first plane electrode and the second plane electrode may be arranged inside or on a surface of the feeder circuit substrate.

In addition, in the wireless IC device, it is desirable that the resonant frequency of a signal from the radiation plate is higher than the resonant frequency of the matching inductance element and the frequency used in the wireless IC device. The resonant frequency of a signal from the radiation plate means a resonant frequency caused by the inductance of the radiation plate, the capacitance generated between both ends of the radiation plate and the plane electrode or the capacitance generated between open ends of the radiation plate. By using the radiation plate at a resonant frequency or below, a magnetic field occurs around the radiation plate, thus making it possible to transmit electromagnetic waves through a dielectric, such as a PET bottle or water. As electromagnetic waves are radiated toward the dielectric, reflection occurs at a boundary portion of different dielectric constants (between the electromagnetic coupling module and the dielectric) and propagates toward the outside.

In addition, the feeder circuit substrate may be a multilayer substrate that embeds the matching inductance element therein or may be a flexible substrate. When the feeder circuit substrate is formed of a multilayer substrate, the inductance element is formed of a laminated type, thus making it possible to provide a compact feeder circuit substrate. When the feeder circuit substrate is a flexible substrate, it may be stuck onto not only a flat portion of an article but also a curved or uneven portion of the article. This expands application of the wireless IC device.

In addition, the radiation substrate may be a multilayer substrate that embeds a coil-shaped radiation plate therein or may be formed of a flexible substrate. When the radiation substrate is a multilayer substrate, the coil-shaped radiation plate is a laminated type, thus making it possible to provide a compact radiation plate. When the radiation substrate is a flexible substrate, it may be stuck onto not only a flat portion of an article but also a curved or uneven portion of the article. This expands application of the wireless IC device.

Alternative Preferred Embodiments

Note that the wireless IC device according to the present invention is not limited to the above preferred embodiments; it may be modified into various forms within the scope of the present invention.

For example, the materials of various electrodes, radiation plates, film substrates, and the like, described in the above preferred embodiments are only illustrative, and a selected material may be used as long as it has a necessary characteristic. In addition, to connect the wireless IC chip to plane electrodes, a process other than metal bumps may be used.

As described above, the present invention is useful for a wireless IC device and, more particularly, is advantageous in that the size of the radiation plate and radiation characteristic may be determined irrespective of the impedance of the wireless IC chip.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device comprising:
   a wireless IC arranged to process transmission and reception signals;
   a feeder circuit including an inductance electrode and a plane electrode; and
   a radiation member including a first end portion and a second end portion; wherein
   the wireless IC is connected to the feeder circuit;
   the first end portion of the radiation member is magnetically coupled to the inductance electrode of the feeder circuit, and the second end portion of the radiation member is capacitively coupled to the plane electrode of the feeder circuit;
   the wireless IC is mainly magnetically coupled to the first end portion of the radiation member via a first connection electrode connected to the inductance electrode of the feeder circuit;
   the wireless IC is mainly capacitively coupled to the second end portion of the radiation member via a second connection electrode connected to the plane electrode;
   the wireless IC is arranged to be operated by a signal received by the radiation member, and a response signal from the wireless IC is radiated outside from the radiation member; and
   the first end portion of the radiation member is defined by a first plane electrode that is arranged to face the inductance electrode.

2. The wireless IC device according to claim 1, wherein both of the first and second end portions of the radiation member are arranged adjacent to each other.

3. The wireless IC device according to claim 1, wherein the radiation member has a belt-shaped configuration.

4. The wireless IC device according to claim 1, wherein the first plane electrode of the radiation member is arranged between the inductance electrode and one end of the radiation member, and is electrically continuous with the radiation member via a connecting portion.

5. The wireless IC device according to claim 1, wherein the first plane electrode of the radiation member has an area that is larger than an area occupied by the inductance electrode.

6. The wireless IC device according to claim 1, wherein the plane electrode of the feeder circuit is arranged between the wireless IC and the radiation member.

7. The wireless IC device according to claim 1, wherein the plane electrode of the feeder circuit is arranged between the wireless IC and the second end portion of the radiation member, and the wireless IC device is arranged so that the first end portion of the radiation member faces the inductance electrode and the second end portion of the radiation member faces the plane electrode of the feeder circuit.

8. The wireless IC device according to claim 7, further comprising a feeder circuit substrate including the feeder circuit, and the plane electrode of the feeder circuit is arranged inside or on a surface of the feeder circuit substrate.

9. The wireless IC device according to claim 1, wherein a resonant frequency of a signal from the radiation member is higher than a resonant frequency of the inductance electrode and a frequency used in the wireless IC device.

10. The wireless IC device according to claim 1, wherein the radiation member has a loop shape.

11. The wireless IC device according to claim 1, wherein the radiation member has a spiral shape.

12. The wireless IC device according to claim 1, further comprising a feeder circuit substrate including the feeder circuit, wherein the feeder circuit substrate is a multilayer substrate in which the inductance electrode is embedded.

13. The wireless IC device according to claim 1, further comprising a feeder circuit substrate including the feeder circuit, wherein the feeder circuit substrate is a flexible substrate.

14. The wireless IC device according to claim 1, wherein the radiation substrate is a multilayer substrate and the radiation member is a coil-shaped radiation member that is embedded in the multilayer substrate.

15. The wireless IC device according to claim 1, wherein the radiation substrate is a flexible substrate.

16. The wireless IC device according to claim 1, wherein the radiation member is a radiation plate.

* * * * *